(12) United States Patent
Benner

(10) Patent No.: US 9,455,554 B2
(45) Date of Patent: Sep. 27, 2016

(54) MOUNTING RAIL FOR THE INTERIOR CONSTRUCTION OF A SWITCH CABINET HOUSING

(71) Applicant: RITTAL GMBH & CO. KG, Herborn (DE)

(72) Inventor: Rolf Benner, Herborn (DE)

(73) Assignee: Rittal GmbH & Co. KG, Herborn (DE)

( * ) Notice: Subject to any disclaimer, the term of this patent is extended or adjusted under 35 U.S.C. 154(b) by 124 days.

(21) Appl. No.: 13/261,888

(22) PCT Filed: Oct. 20, 2012

(86) PCT No.: PCT/DE2012/001019
§ 371 (c)(1),
(2) Date: May 15, 2014

(87) PCT Pub. No.: WO2013/075684
PCT Pub. Date: May 30, 2013

(65) Prior Publication Data
US 2014/0252186 A1    Sep. 11, 2014

(30) Foreign Application Priority Data

Nov. 24, 2011   (DE) .................. 10 2011 119 277

(51) Int. Cl.
*A47B 88/00*  (2006.01)
*H02B 1/32*  (2006.01)

(52) U.S. Cl.
CPC ...................... *H02B 1/32* (2013.01)

(58) Field of Classification Search
CPC ................. H02B 1/32; H02B 1/301
USPC ............ 248/226.1; 312/334.4, 265.1, 265.2; 211/190, 26.2
See application file for complete search history.

(56) References Cited

U.S. PATENT DOCUMENTS

| 5,833,337 | A * | 11/1998 | Kofstad | ............... | H05K 7/1421 |
| | | | | | 211/175 |
| 6,070,957 | A * | 6/2000 | Zachrai | ................ | H02B 1/32 |
| | | | | | 312/265.1 |
| 6,155,434 | A * | 12/2000 | Benner | ................ | H02B 1/32 |
| | | | | | 211/190 |
| 7,255,409 | B2 * | 8/2007 | Hu | ................. | A47B 88/044 |
| | | | | | 211/26 |

FOREIGN PATENT DOCUMENTS

| DE | 19647802 C1 | 1/1998 |
| DE | 29806878 U1 | 6/1998 |
| DE | 19712362 C1 | 7/1998 |
| DE | 19917290 C1 | 10/2000 |
| DE | 19737673 C5 | 10/2005 |
| DE | 102008052291 A1 | 4/2010 |
| EP | 0951121 A1 | 10/1999 |

* cited by examiner

*Primary Examiner* — Todd M Epps
(74) *Attorney, Agent, or Firm* — Marshall & Melhorn, LLC

(57) ABSTRACT

The invention relates to a mounting rail for the interior construction of a switch cabinet housing, said mounting rail comprising a mounting section that has a clamping section at its first end and a support section at its second end opposite the first end, characterized in that the clamping section has a knee lever with a fastening side, via which the knee lever is detachably screwed to the first end of the mounting section and with a clamping side that includes an angle with the fastening side.

12 Claims, 5 Drawing Sheets

MOUNTING RAIL FOR THE INTERIOR CONSTRUCTION OF A SWITCH CABINET HOUSING

BACKGROUND OF THE INVENTION

The invention relates to a mounting rail for the interior construction of a switch cabinet housing, said mounting rail comprising a mounting section that has a clamping section at its first end and a support section at its second end opposite the first end.

A mounting rail of this type is known from DE 10 2008 052 291 A1. Here, the support section is formed to be supported by the rear wall of the switch cabinet housing, while the clamping section can be clamped in the region of the front side of the switch cabinet housing with the aid of clamping means. For clamping, the clamping section comprises a leg oriented to the front side of the switch cabinet housing which is connected to the mounting section, and a deflection oriented at an angle to the leg, the deflection comprising at least one correcting element. At least in sections, the correcting element forms a clamping area. The deflection comprises a hole which is aligned with a threaded seat of a weld nut welded to that side of the deflection which faces away from the clamping area. A screw is provided as a clamping means which can be introduced into the weld nut and which applies a clamping force to the rear side of the clamping area. Other mounting rails for the interior construction are also known from DE 197 37 673 C2, DE 196 47 802 C1 and DE 298 06 878 U1.

The previously described mounting rail has the disadvantage that mounting thereof within the switch cabinet housing is comparably cumbersome. This is a consequence of the fact that for turning the clamping screws a respective tool, for example a socket screw key, must engage behind the clamping section. Since two clamping screws are necessary for sufficiently fixing the mounting rail within the switch cabinet housing, those must be tightened simultaneously, i.e. stepwise alternating, in order to avoid tilting of the mounting rail within the switch cabinet housing. The mounting rail has a further disadvantage that the clamping section takes up much space, so that the usable length of the mounting rail is limited. Last but not least the mounting rail known from the prior art needs a plurality of folded edges, so that it is expensive in production.

SUMMARY OF THE INVENTION

It is the object of the invention to propose a mounting rail of the introductory type which can be easily mounted within a switch cabinet housing, which comprises a great usable length of the mounting section and uses simple technical means and can be produced less costly.

According to the invention, this object is solved by a mounting rail according to patent claim 1. Preferred embodiments of the invention are subject matter of dependent claims 2 to 10.

The mounting rail of the invention is characterized in that the clamping section comprises a knee lever. The knee lever in turn comprises a fastening side via which the knee lever is detachably screwed to the first end of the mounting section, and a clamping side that includes an angle with the fastening side. When the present invention talks of clamping side and fastening side including an angle, basically all angles are meant which are practically greater than 0° and practically smaller than 180°. In the preferred embodiments, the angle included between the clamping side and the fastening side is an obtuse angle between 90° and 140°. Since the knee lever is immediately screwed to the first end of the mounting section according to the invention, it is achieved that the mounting section and a system perforation provided thereby may extend to the knee lever, so that the usable length of the mounting rail for the interior construction is enlarged compared with known mounting rails.

In a preferred embodiment of the invention, the mounting section is shaped as a U profile, comprising a mounting side which keeps two folded edges spaced apart from one another. It is provided that the mounting side comprises at least one attachment seat, preferably, however, a plurality of attachment seats or a system perforation.

It is further preferred that the first end of the mounting section comprises a bend, the free end thereof extending spaced apart from and parallel to the mounting side, the fastening side being swivel-mounted on the bend. Preferably, the fastening side includes an opening for a screw or the like which is aligned with another opening in the free end of the mounting section. It is in particular preferred that the bend at the free end of the first and of the mounting section is folded wherein the holes at the first end of the mounting section are spaced apart from the bend to apply a sufficient lever force. If the holes of the mounting section and the fastening side are furthermore aligned with a threaded seat which is connected with the hole at the first end of the mounting section in a force-fitting manner, the knee lever may be swiveled around the pivot axis formed by the bend by screwing the fastening side to the first end of the mounting section.

It is preferred that the knee lever is formed in one piece. In the preferred embodiment, the fastening side and the clamping side are folded edges. In the simplest embodiment, a knee lever of this type is folded from a substantially rectangular steel sheet of suitable rigidity, where a single folded edge is sufficient to produce a knee lever according to the invention where the fastening side and the clamping side include an angle, preferably an obtuse angle. That simplest embodiment of the knee lever comprises a hole at the fastening side spaced apart from the folded edge. The clamping side of the knee lever may comprise two exposed corners forming claws which at least partly bury into the switch cabinet housing during clamping of the knee lever.

In another embodiment of the knee lever it is shaped as a U profile which sits on the mounting section along its inner side. Preferably in this embodiment, also the mounting section is shaped from a U profile having outer dimensions which are adjusted to the inner dimensions of the knee lever so that it can be put onto the mounting section in a form-locking or roughly form-locking manner. The knee lever formed as a U profile comprises parallel flanges which are trapezoidal. It is provided that the clamping side is formed by that free end of the U profile which faces away from the mounting section. Also in this embodiment of the knee lever it is in turn properly provided that the U profile of the knee lever is pivoting on a bend of the mounting section as previously described. Furthermore, it may again be provided that the fastening side comprises a first hole which is aligned with a second hole of the first end of the mounting section and with a threaded seat of the mounting section.

As already indicated, for a particular effective fixing of the mounting rail to the inner sides of the switch cabinet housing, it may be provided that the support section, at an end facing away from the mounting section, or the clamping side, at an end facing away from the mounting section, comprises at least one claw. Preferably, both the support section and the clamping side comprise at least one claw at their ends facing away from the mounting section.

Depending on the embodiment, the mounting section preferably comprises a system perforation adapted to the application. For example, it may comprise uniformly spaced holes and/or rectangular slotted holes. An embodiment is conceivable, wherein at least one of the attachment seats formed on the mounting section is a slotted hole extending in longitudinal direction of the mounting rail, the slotted hole being bordered by parallel sides which have a spacing greater than a diameter of a shaft of a bolt and smaller than a diameter of a head end of the bolt. Expediently, the slotted hole comprises an extension where the spacing of the parallel sides is larger than the diameter of the head end of the bolt. Also in this embodiment, it is preferred that mounting section is produced from a U profile having lateral folded edges which are folded towards the rear side of the mounting side and thus space apart the mounting side in a built-in state of the mounting rail from the housing wall or the housing bottom.

It is preferred that the mounting rail comprises at least two slotted holes extending in longitudinal direction of the mounting rail which are arranged behind one another and spaced apart from another, wherein neighboring slotted holes are separated by a bridge joining the two folded edges. By using several slotted holes separated by bridges in place of a continuous slotted hole it is achieved that stability of the mounting section is not unduly affected by those slotted holes.

BRIEF DESCRIPTION OF THE DRAWINGS

Further details of the invention are explained with the aid of the appended figures. It is shown in.

DETAILED DESCRIPTION OF THE INVENTION

Figure 1:
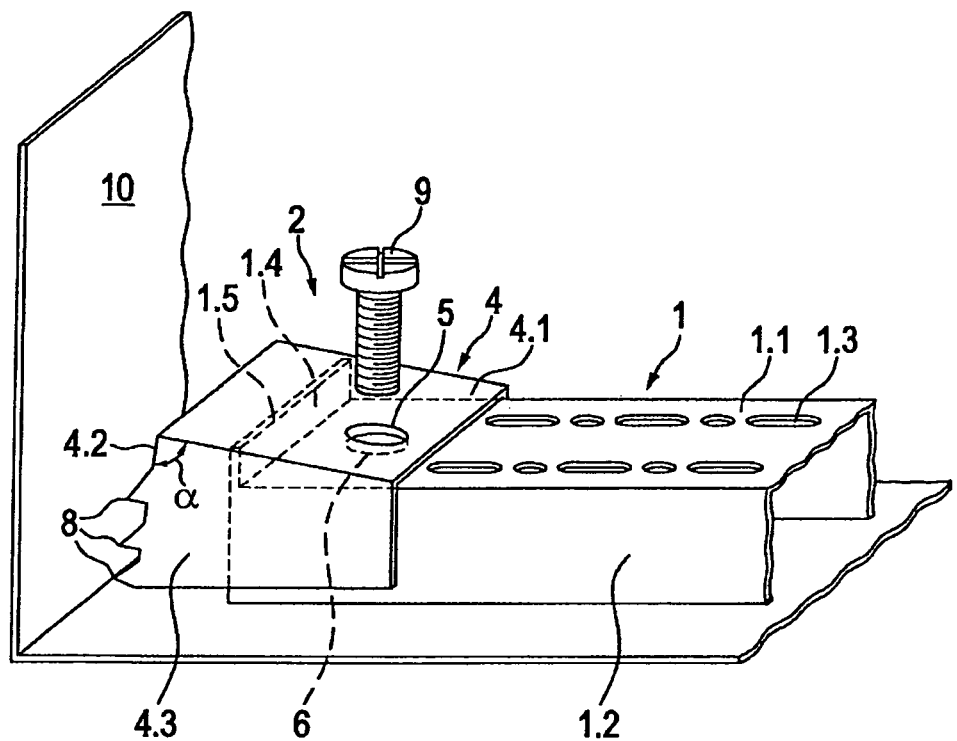
FIG. 1 the mounting section and the clamping section of a first embodiment of the invention.

FIG. 1 illustrates a detailed view of a clamping section 2 of a first embodiment of the mounting rail for the interior construction of a switch cabinet housing according to the invention. Clamping section 2 directly adjoins the first end of mounting section 1 and includes a knee lever 4 having a fastening side 4.1 and a clamping side 4.2. Clamping side 4.2 and fastening side 4.1 include an angle α. Mounting section 1 is a U profile and comprises further to a mounting side 1.1 two parallel folded edges 1.2 bent from the mounting side 1.1 orthogonally which are spaced from another by mounting side 1.1. Mounting side 1.1 comprises a system perforation having attachment seats 1.3 which in the present case formed by two rows of alternately circular and rectangular cut-outs. Mounting side 1.1 comprises a bend 1.4 at its end facing towards clamping section 2, which bend in turn comprises a free end 1.5 extending parallel and spaced to the mounting side 1.1. Bend 1.4 is substantially a folded edge which extends vertically upwards from the mounting side 1.1. Fastening side 4.1 of knee lever 4 is swivel-mounted on free end 1.5 of bend 1.4. Here, the knee lever is formed as one piece and a U-profile which is put onto mounting section 1 along its inner side. Knee lever 4 comprises parallel flanges 4.3 which are trapezoidal. Clamping side 4.2 is formed by that free end of U-profile which is arranged facing away from mounting section 1. Fastening side 4.1 comprises a first hole 5 which is aligned which a second hole 6 of the first end of mounting section 1 as well as with a threaded seat 7 of mounting section 1 which is not visible. Threaded seat 7 is presently welled to the bottom of mounting side 1.1 with the mounting side 1.1. In a simplest case, it is provided by a nut welded to the rear side of mounting side 1.1. Clamping side 4.2 comprises claws 8 at an end facing away from mounting section 1 which in the mounting position of the mounting rail exactly corresponds to the end facing to the housing wall 10.

For mounting the mounting rail within a switch cabinet housing, preferably between parallel housing walls, the mounting rail can be positioned between the first an the second housing wall, preferable with pre-mounted knee lever 4 which, however, is not yet fixedly screwed. As soon as the mounting rail has taken its final position, the knee lever, more precisely the fastening side 4.1 thereof, can be screwed on the mounting section, more precisely on the mounting side 1.1. By tightening screw 9, the fastening side 4.1 approaches mounting side 1.1, with the consequence that knee lever 4 is pivoted about the free end 1.5 of bent 1.4. While pivoting knee level 4, also the lower end of clamping side 4.2 carrying claws 8 is pivoted toward housing wall 10. Due to the lever action of pivoted knee lever 4 as previously described, claws 8 can be urged into the surface of wall 10 with power, while the mounting rail is supported by support section, which is not illustrated, at the opposite housing wall.

Figure 2:
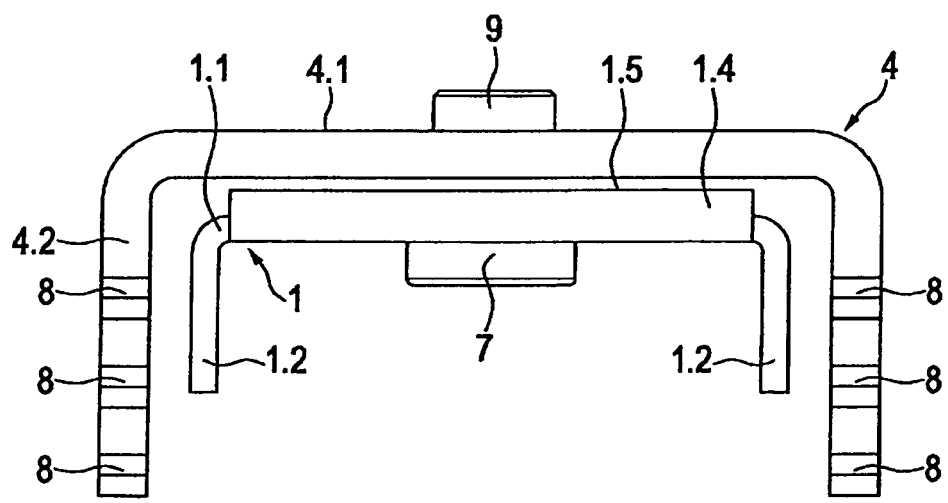
FIG. 2 a front view of the clamping section of the embodiment according to FIG. 1.

FIG. 2 illustrates a front view of clamping section 2. In this view, it may be recognized that bend 1.4 is formed as a folded edge of mounting side 1.1. in the illustrated embodiment. Also claws 8 at clamping side 4.2 are clearly recognized. Screw 9 enters through aligned apertures in fastening side 4.1 and mounting side 1.1 and is received in a threaded seat 7 which is a welded nut, at the rear side of mounting side 1.1. It may further be recognized that both mounting section 1 and knee lever 4 are formed as U-profiles having parallel flanges and can thus be produced with less costs.

Figure 3:
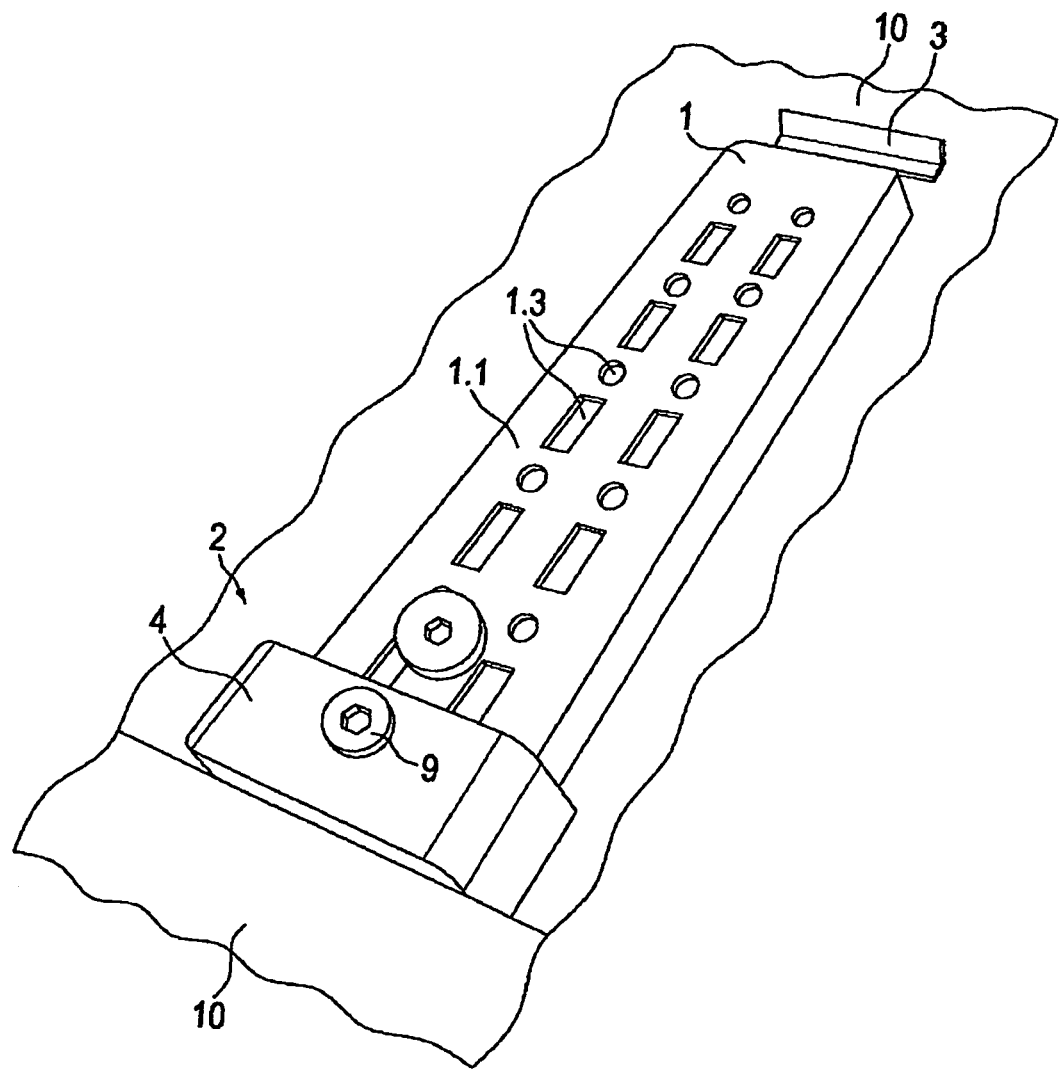
FIG. 3 the embodiment of FIGS. 1 and 2 in a built-in state.

FIG. 3 shows the embodiment of FIGS. 1 and 2 in a mounting position. Here, the mounting rail is clamped between opposite housing walls 10. Support section 3 comprises a folded edge which abuts housing wall 10 in a substantially form-fit manner. Mounting section 1 comprises a system perforation having attachment seats 1.3 in the mounting side 1.1. It can be recognized that the system perforation immediately reaches knee lever 4, so that approximately the entire length of the mounting rail can be used for interior instruction.

Figure 4:
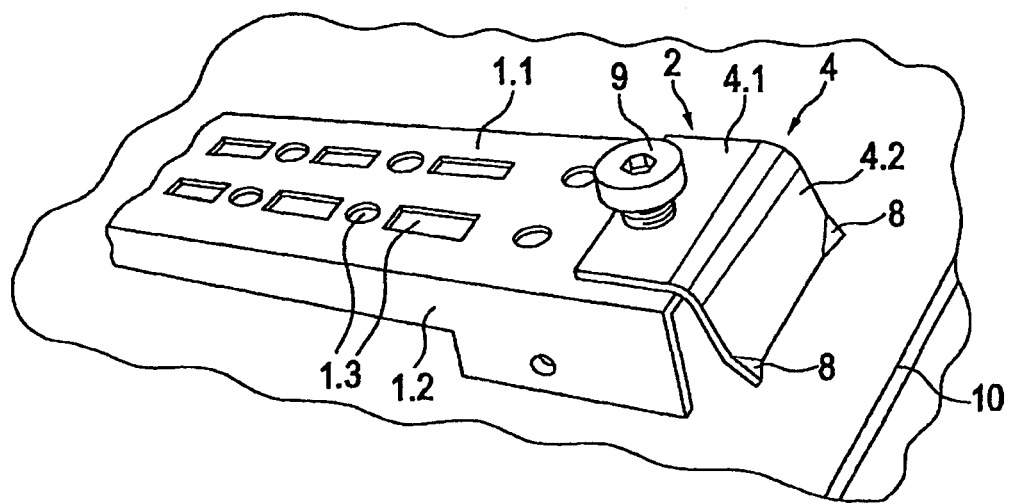
FIG. 4 the mounting section and the clamping section of the preferred embodiment of the invention.

FIG. 4 illustrates the preferred embodiment of the invention in which knee lever 4 is realized with particularly simple technical means. Knee lever 4 consists of an essentially rectangular steel sheet which has folded edges parallel to two sheet sides. By this folding, on the one hand, a fastening side 4.1, and on the other hand, a clamping side 4.2 is formed. Fastening side 4.1 and clamping side 4.2 include in an obtuse angle resulting in that clamping side 4.2 protrudes with its lover edge comprising claws 8 towards housing wall 10 when fastening side 4.1 is parallel to mounting side 1.1. It is achieved thereby that clamping side 4.2, when clamping the mounting rail, substantially exclusively contacts housing wall 10 with claws 8, so that the entire force applied to the knee lever by tightening screw 9 is transferred through pointed claws 8 to housing wall 10. It may be further recognized that claws 8 in a simplest manner are realized by marginally bending two corners of the rectangular steel sheet forwardly, at the clamping side 4.2. Mounting section, in turn, is shaped as a U-profile comprising parallel folded edges 1.2 which are jointed by a mounting side 1.1 and are space apart from another.

Figure 5:
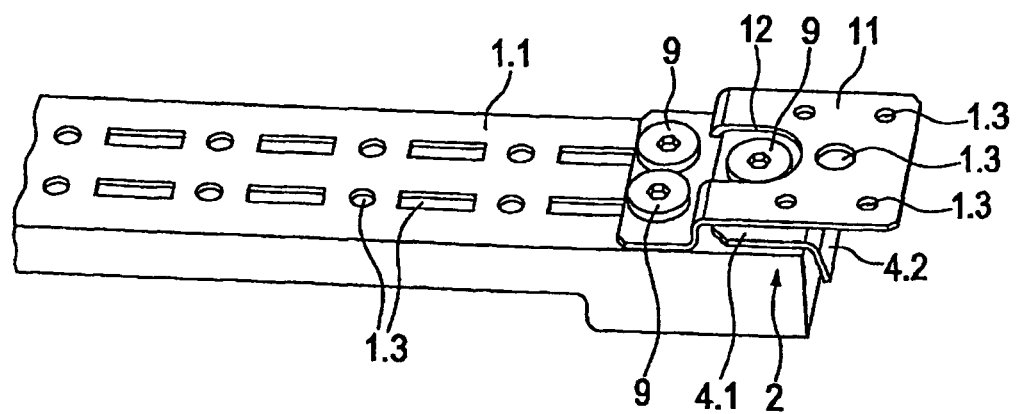
FIG. 5 the mounting rail of FIG. 4 in a built-in state.

FIG. 5 shows the embodiment illustrated in FIG. 4, wherein an elbow 11 having additional attachment seats 1.3 extends above clamping section 2 and in particular knee lever 4, so that also clamping section 2 is useable for interior construction. Further to attachment seats 1.3, a recess 12 is provided through which screw 5 can be tightened or loosened, respectively. Elbow 11 is screwed with the aid of two further screws 9 with mounting section 1 via system perforation of mounting section 1 immediately extending to knee lever 4.

Figure 6:
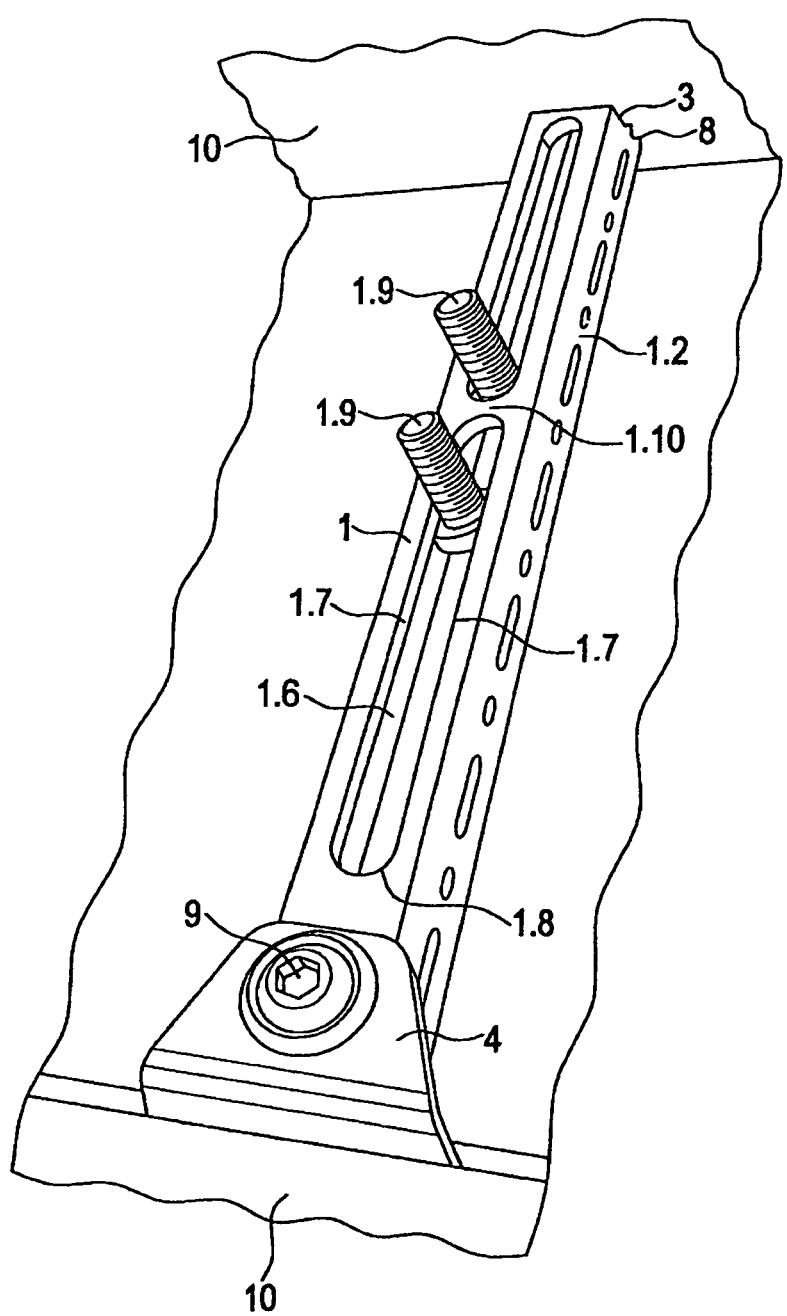
FIG. 6 a further embodiment comprising holes introduced in slotted holes.
Figure 7:
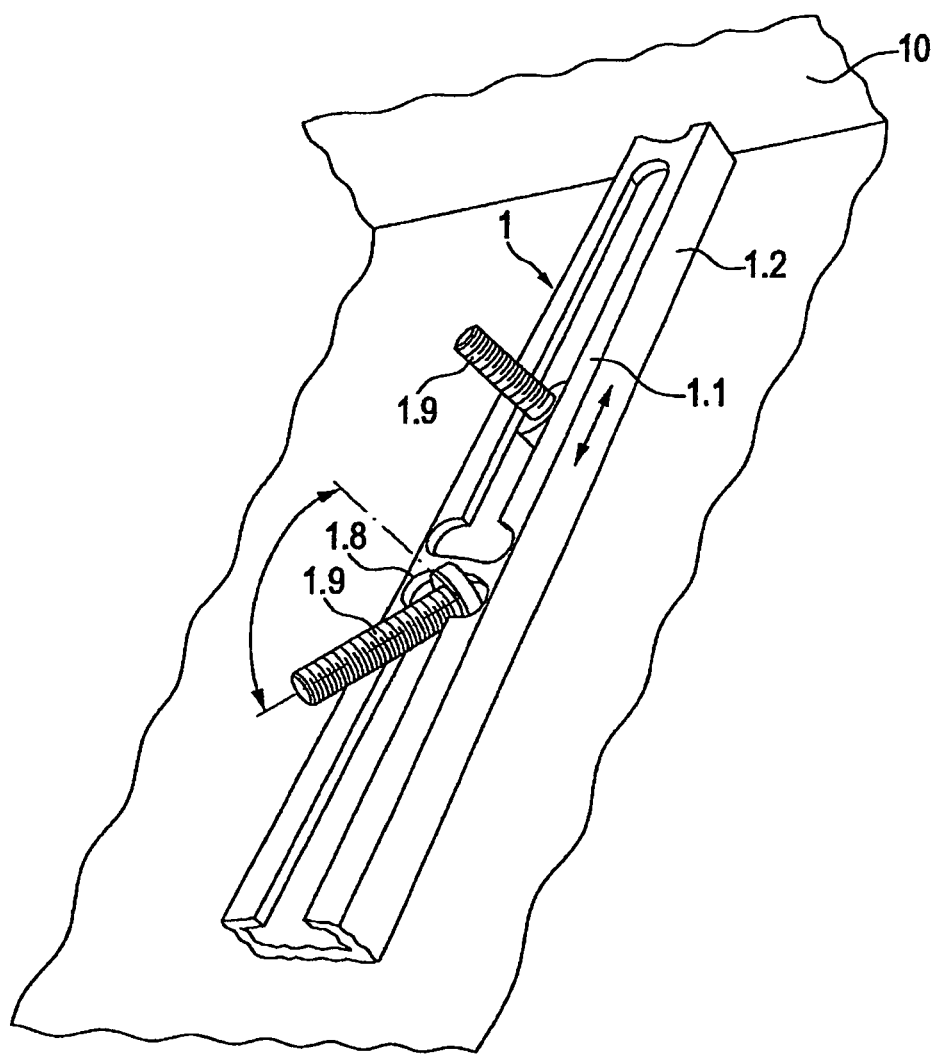
FIG. 7 an illustration of the introduction process of a bolt into the slotted hole of a mounting rail according to FIG. 6.

In the embodiment of the invention illustrated in FIGS. 6 and 7, mounting section 1 comprises attachment seats 1.3 which are embodied as a slotted hole 1.6. Slotted holes 1.6 extend in longitudinal direction of mounting side 1.1. Slotted hole 1.6 is bordered by parallel sides 1.7, wherein parallel sides 1.7 comprise a spacing which is greater than the diameter of the shaft of bolt 1.9 and smaller than the diameter of the head end of bolt 1.9. By this dimensional ratio of spacing of sides 1.7 and diameter of shaft and head end, it is achieved that bolts 1.9 engage behind mounting side 1.1 in a built-in state. An extension 1.8 serves to merge bolts 1.9 into slotted holes 1.6. In this embodiment mounting section 1 is preferably shaped as a U-profile so that the head ends in a built-in state have sufficient active space between housing wall and bottom surface of mounting side 1.1. Within slotted holes 1.6 of mounting sides 1.1, the parallel flanges 1.2 may also comprise a system perforation, presently consisting of two rows of alternately circular holes and rectangular slotted holes. Support section 3 is immediately formed by a free end of mounting section 1 which is also probably provided with claws 8 for producing a force fitting connection with housing wall 10.

Presently, mounting side 1.1 comprises two slotted holes extending in longitudinal direction of mounting side 1.1 which are arranged one behind the other and spaced apart from another in longitudinal direction of mounting side 1.1. At that position where slotted holes 1.1 are adjoining, they are separated by a bridge 1.10. Bridge 1.10 ensures that the mounting sections have a sufficient residual stability notwithstanding slotted holes 1.6.

In a simplest case, bolts 1.9 are machine screws or the like, which, as illustrated in FIG. 7, can be introduced via extensions 1.8 into the mounting section with their heads.

The features disclosed in the foregoing description, in the claims and/or in the accompanying drawings may, both separately and in any combination thereof, be material for realising the invention in diverse forms thereof.

REFERENCE NUMERAL LIST

1 Mounting section
1.1 Mounting side
1.2 Folded edge
1.3 Attachment seat
1.4 Bend
1.5 Free end of bend
1.6 Slotted hole
1.7 Side of slotted hole
1.8 Extension
1.9 Bolt
1.10 Bridge
2 Clamping section
3 Support section
4 Knee lever
4.1 Fastening side
4.2 Clamping side
4.3 Flange
5 First hole
6 Second hole
7 Threaded seat
8 Claws
9 Screw
10 Housing wall
11 Elbow
12 Extension
α Obtuse angle

The invention claimed is:

1. A mounting rail for an interior construction of a switch cabinet housing, said mounting rail comprising a mounting section that has a clamping section at its first end and a support section at its second end opposite the first end, wherein the clamping section has a knee lever with a fastening side, via which the knee lever is detachably screwed to the first end of the mounting section and with a clamping side that includes an obtuse angle (α) with the fastening side.

2. The mounting rail of claim 1, wherein the mounting section is shaped as a U profile, with a mounting side which keeps two folded edges spaced apart from one another, said mounting side comprising at least one attachment seat.

3. The mounting rail of claim 1, wherein the first end of the mounting section comprises a bend, a free end thereof extending spaced from and parallel to the mounting side, the fastening side being swivel-mounted on the bend.

4. The mounting rail of claim 1, wherein the knee lever is formed in one piece, the fastening side and the clamping side being folded edges thereof.

5. The mounting rail of claim 2, wherein the knee lever is shaped as a U profile which sits on the mounting section along its inner side, the knee lever comprising parallel flanges which are trapezoidal, and the clamping side being formed by a free end of the U profile facing away from the mounting section.

6. The mounting rail of claim 1, wherein the fastening side comprises a first hole which is aligned with a second hole of the first end of the mounting section as well as with a threaded seat of the mounting section.

7. The mounting rail of claim 1, wherein the support section, at an end facing away from the mounting section, comprises at least one claw.

8. The mounting rail of claim 2, wherein the attachment seat comprises a slotted hole extending in longitudinal direction of the mounting side, the slotted hole being bordered by parallel sides having a spacing which is greater than a diameter of a shaft of a bolt and smaller than a diameter of a head end of the bolt.

9. The mounting rail of claim 8, wherein the slotted hole comprises an extension where the spacing of the parallel sides is greater than the diameter of the head end of the bolt.

10. The mounting rail of claim 8, wherein the mounting side comprises at least two slotted holes extending in longitudinal direction of the mounting side which are arranged behind one another and spaced from another, wherein neighboring slotted holes are separated by a bridge joining the two folded edges.

11. The mounting rail of claim 1, wherein the clamping side, at an end facing away from the mounting section, comprises at least one claw.

12. The mounting rail of claim 11, wherein the support section, at an end facing away from the mounting section, comprises at least one claw.

\* \* \* \* \*